United States Patent
Kim

(10) Patent No.: US 10,800,204 B2
(45) Date of Patent: Oct. 13, 2020

(54) TOUCH PEN HOLDER UNIT

(71) Applicant: Kum Oh Electronics CO., LTD., Bucheon-si (KR)

(72) Inventor: Ki Sang Kim, Bucheon-si (KR)

(73) Assignee: KUM OH ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/371,530

(22) Filed: Apr. 1, 2019

(65) Prior Publication Data
US 2019/0384417 A1 Dec. 19, 2019

(30) Foreign Application Priority Data
Jun. 19, 2018 (KR) ........................ 10-2018-0069977

(51) Int. Cl.
*B43K 23/00* (2006.01)
*G06F 3/0354* (2013.01)

(52) U.S. Cl.
CPC .......... *B43K 23/002* (2013.01); *B43K 23/001* (2013.01); *G06F 3/03545* (2013.01); *Y10T 24/45099* (2015.01)

(58) Field of Classification Search
CPC ... G06F 3/03545; B43K 29/00; B43K 23/002; B43K 23/001; Y10T 24/45005; Y10T 24/4501; Y10T 24/45099; Y10T 403/57; Y10T 403/5733; Y10T 403/5761; Y10T 403/5766; Y10T 403/5773; F16L 37/144; F16L 37/088; F16L 37/0885

USPC ........ 401/131, 195; 403/300, 305, 309, 310, 403/311
See application file for complete search history.

(56) References Cited

U.S. PATENT DOCUMENTS

| 1,831,765 | A | * | 11/1931 | Gouverneur | ........... H01B 17/10 403/310 |
| 2,060,548 | A | * | 11/1936 | Bolling | ...................... F16B 7/22 403/300 |
| 2,386,473 | A | * | 10/1945 | Kanary | ................... E04C 5/125 403/310 |
| 2,739,018 | A | * | 3/1956 | Collett | .................. E21B 17/105 175/325.5 |
| 3,527,485 | A | * | 9/1970 | Stanley | ................. F16L 37/144 285/305 |
| 3,698,747 | A | * | 10/1972 | Wing | .................... F16L 37/144 285/305 |

(Continued)

FOREIGN PATENT DOCUMENTS

| CA | 2882313 | 8/2016 |
| JP | 2002163733 | 6/2002 |

(Continued)

*Primary Examiner* — Jonathan Liu
*Assistant Examiner* — Guang H Guan
(74) *Attorney, Agent, or Firm* — Cantor Colburn LLP

(57) ABSTRACT

Provided is a touch pen holder unit for holding a touch pen to prevent loss and, more particularly, a touch pen holder unit capable of fastening a touch pen easily and firmly. The touch pen holder unit includes: a wire having a locking part at an end thereof; and a body having a first locking groove at an upper portion of the body and a second locking groove below the first locking groove, wherein the locking part of the wire is seated on the first locking groove and a head of a touch pen is seated on the second locking groove.

1 Claim, 6 Drawing Sheets

(56) References Cited

U.S. PATENT DOCUMENTS

| | | | | |
|---|---|---|---|---|
| 4,699,536 | A * | 10/1987 | Berman | B43K 23/002 401/195 |
| 5,123,548 | A * | 6/1992 | Milne | B43K 23/002 211/69.5 |
| 5,131,632 | A * | 7/1992 | Olson | F16L 37/02 285/322 |
| 6,099,196 | A * | 8/2000 | Lancelot, III | E04C 5/165 403/300 |
| 6,167,596 | B1 * | 1/2001 | Berman | B43K 23/04 211/69.5 |
| 6,435,749 | B1 * | 8/2002 | Lecce | B43K 23/12 24/10 R |
| 6,735,825 | B1 * | 5/2004 | Berman | B43K 23/001 211/69.1 |
| 6,830,402 | B2 * | 12/2004 | Sunatori | B43K 23/001 401/100 |
| 7,270,289 | B2 * | 9/2007 | Kish | A45F 5/004 242/280 |
| 7,461,989 | B1 | 12/2008 | Dickover et al. | |
| 7,470,076 | B1 | 12/2008 | Dickover et al. | |
| 8,172,474 | B2 * | 5/2012 | Dickover | B43K 23/002 24/3.13 |
| 8,505,435 | B2 * | 8/2013 | Mallmann | B60T 13/57 91/369.3 |
| 8,672,571 | B2 * | 3/2014 | Monzo | B43K 8/003 401/131 |
| 2003/0053856 | A1 * | 3/2003 | Chen | F16D 1/027 403/305 |
| 2004/0006850 | A1 | 1/2004 | Wax | |
| 2009/0016802 | A1 | 1/2009 | Castoro | |
| 2009/0142126 | A1 | 6/2009 | Dickover et al. | |
| 2019/0384417 | A1 * | 12/2019 | Kim | B43K 23/002 |

FOREIGN PATENT DOCUMENTS

| | | |
|---|---|---|
| KR | 20110018281 | 2/2011 |
| KR | 2020170002555 | 7/2017 |

* cited by examiner

TOUCH PEN HOLDER UNIT

BACKGROUND OF THE INVENTION

Field of the Invention

The present invention relates generally to a touch pen holder unit for holding a touch pen to prevent loss of the touch pen and, more particularly, to a touch pen holder unit capable of fastening a touch pen easily and firmly.

Description of the Related Art

Generally, a touch pen is used for inputting a command of a user or drawing a picture by touching a touch screen of various mobile devices.

The touch pen is provided in most mobile devices such as a smart phone, a tablet PC, etc., which are frequently used by users.

When the user touches the touch screen with a finger for long time, the user may suffer a low temperature burn on the finger, and finger is not suitable for drawing precise expressions such as thin lines or lines having constant thickness on the touch screen. Accordingly, the touch pen is generally used with frequently used mobile devices.

Recently, in addition to the input function of the touch pen by simply touching the touch screen, a function of sensing approach of the touch screen and touch pen and a function of inputting specific commands to the mobile devices through buttons without touching the touch screen are added to the touch pen. That is, the touch pen has become more advanced and more expensive.

However, when visitors experience mobile devices at showrooms or shops selling the mobile devices, the touch pen may be lost when visitors leave the touch pen anywhere other than a place where the touch pen should be after using it, and the touch pen may be stolen by the visitors after the visitors use the touch pen.

Therefore, a means is necessary to prevent loss or theft of the touch pen, but the means have not yet been introduced because proportion of the touch pen in the mobile devices is low.

For reference, in Korean Application Publication No. 10-2011-0018281 "Stylus pen for preventing losing", since a stylus pen, that is, a touch pen is provided with a cable spool part at a rear of the touch pen to spool a cable automatically by a spiral spring, thus loss of the touch pen may be prevented.

However, the integrated structure of the touch pen such as the cable and the spool part increases price of the touch pen and decreases product competitiveness of the touch pen.

The foregoing is intended merely to aid in the understanding of the background of the present invention, and is not intended to mean that the present invention falls within the purview of the related art that is already known to those skilled in the art.

Documents of Related Art (Patent document 1) Korean Application Publication No. 10-2011-0018281.

SUMMARY OF THE INVENTION

Accordingly, the present invention has been made keeping in mind the above problems occurring in the related art, and the present invention is intended to propose a touch pen holder unit to prevent loss or theft of a touch pen, which is a problem caused when a visitor uses the touch pen provided along with a mobile device at a shop or showroom and then moves away from where it should be or takes the touch pen, and as another objective, the present invention is intended to propose the touch pen holder unit having a structure for fastening the touch pen conveniently and firmly.

In order to achieve the above objective, according to one aspect of the present invention, there is provided a touch pen holder unit, which includes: a touch pen having a head; a wire having a locking part at an end thereof; and a body having a first locking groove at an upper portion of the body and a second locking groove below the first locking groove, wherein the locking part of the wire is seated on the first locking groove and the head of the touch pen is seated on the second locking groove.

The body may have a first partial body portion and a second partial body portion, wherein a first portion of the locking part of the wire and a first portion of the head of the touch pen are seated on the first partial body portion, and wherein a second portion of the locking part of the wire and a second portion of the head of the touch pen are seated on the second partial body portion. In addition, the touch pen holder unit may further include: a housing fitted over outer circumferential surfaces of the first and second partial body portions and preventing the first and second partial body portions from being separated from each other.

The first partial body portion has a coupling hole and the housing has a coupling hole. In addition, the touch pen holder unit may further include: a locking clip inserted into the coupling hole of the housing and into the coupling hole of the first partial body portion, and preventing the body and the housing from being separated from each other.

The locking clip may include: a clip body having two leg portions defining a space therebetween, wherein the locking part of the wire is received in the space defined between the two leg portions, a locking step formed on each of opposite outer surfaces of the two leg portions of the clip body and locked to a corresponding inner wall of the first partial body portion, and an eject groove formed on an upper part of a side surface of the clip body.

According to the present invention as configured above, since the touch pen holder unit is connected to the head of the touch pen and prevents the touch pen from being placed outside a predetermined range, loss or theft of the touch pen can be prevented. Further, since the body is formed of the first partial body portion and the second partial body portion, the head of the touch pen and the locking part of the wire can be conveniently and rapidly fastened together. In addition, the first partial body portion and the second partial body portion of the body are firmly fastened through the housing and the locking clip, so the touch pen holder unit can be prevented from being unfastened unintentionally. Accordingly, the touch pen holder unit of the present invention is very useful for industrial development.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
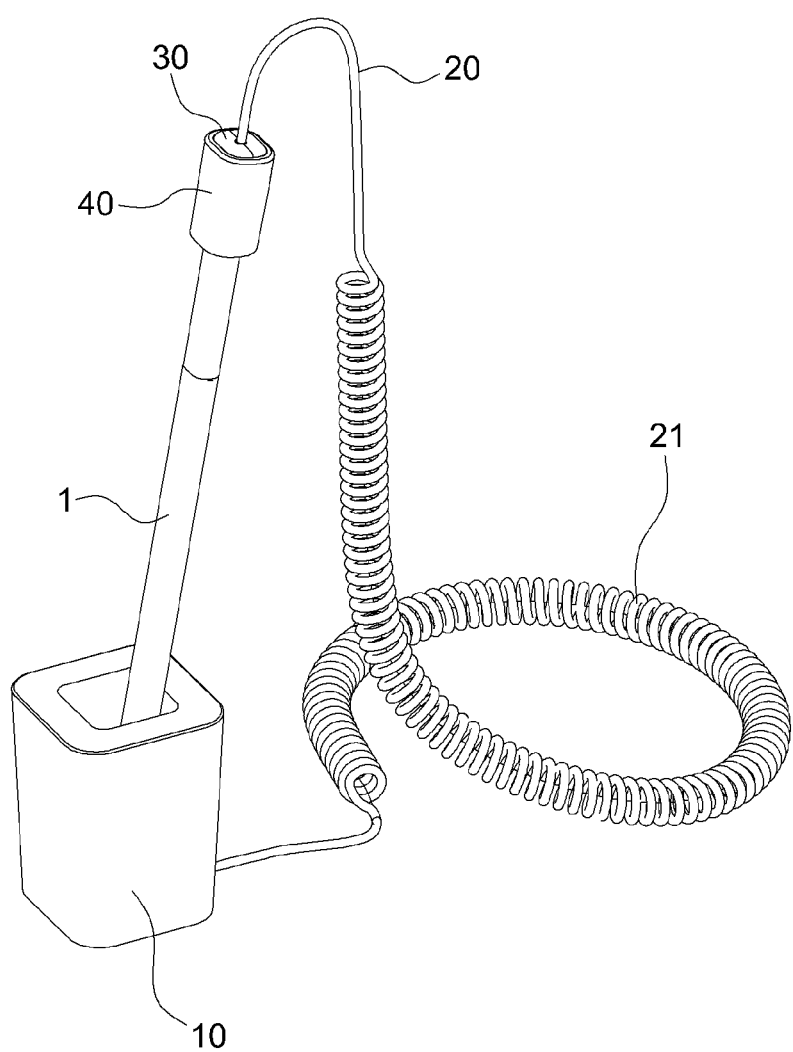
FIG. 1 is a perspective view showing an example of a touch pen fastened by a touch pen holder unit according to an embodiment of the present invention.
Figure 2:
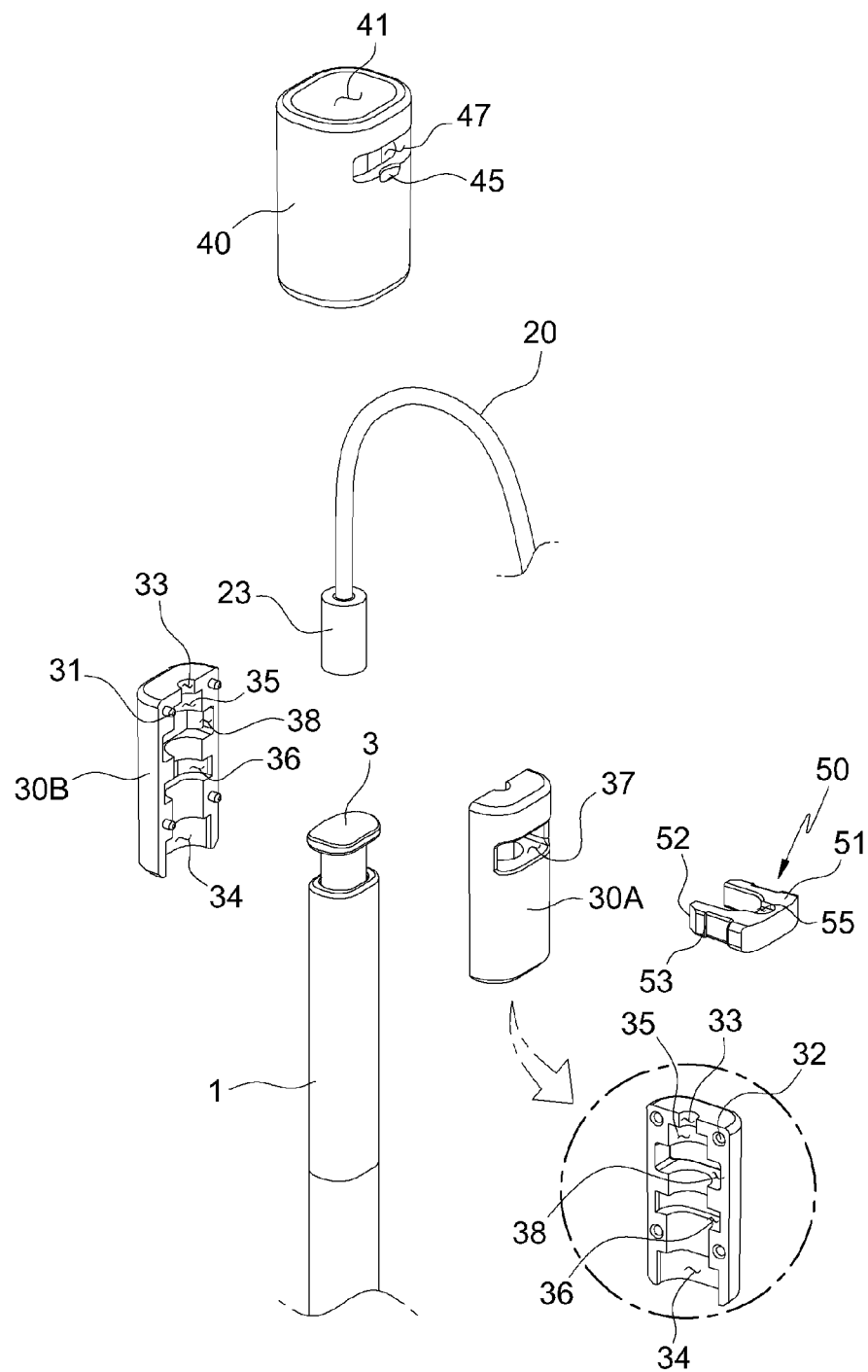
FIG. 2 is an exploded perspective view of the touch pen holder unit of FIG. 1.
Figure 3A:
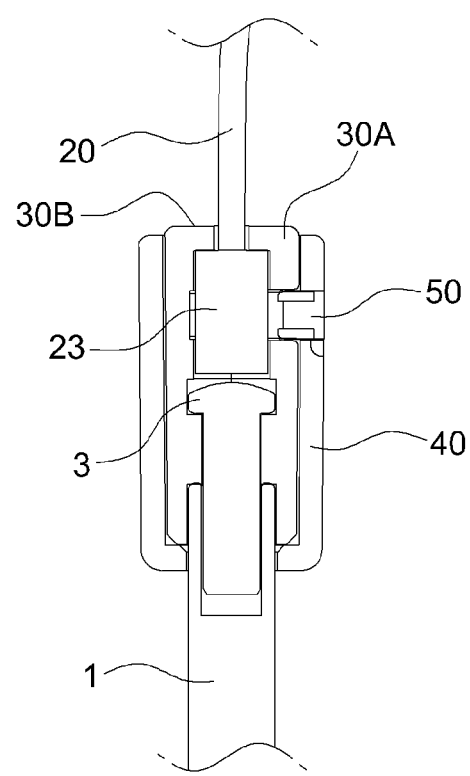
FIGS. 3A and 3B are cross-sectional views showing a major part of the touch pen holder unit.
Figure 3B:
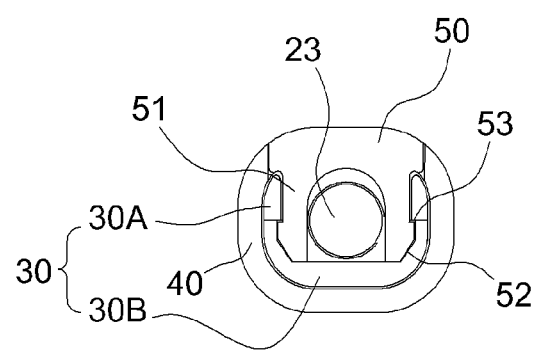

Hereinbelow, a touch pen holder unit according to an exemplary embodiment of the present invention will be described in detail with reference to the accompanying drawings.

Prior to the description, the present invention will now be described in detail on the basis of aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the drawings, like reference numerals, particularly, reference numerals having the same last two digits or the same last two digits and letters refer to like elements having like functions throughout, and unless the context clearly indicates otherwise, elements referred to by reference numerals of the drawings should be understood on the basis of this standard.

Also, for convenience of understanding of the elements, in the drawings, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

As shown in the accompanying drawings, the touch pen holder unit according to the present invention includes a storage container 10, a wire 20, a body 30, a housing 40, and a locking clip 50.

The storage container 10 stores a touch pen 1 inserted therein. The storage container 10 may be attached to an exhibition table in a shop using a double-sided tape.

The wire 20 connects the storage container 10 and the touch pen 1 so that the touch pen 1 is not separated from the storage container 10 by at least a predetermined distance. That is, the wire 20 prevents loss of the touch pen 1.

The wire 20 is provided with a coil part 21 coiled to increase its length, and with a locking part 23 coupled to the body 30 and a coupling part coupled to the storage container 10 at opposite sides thereof.

The body 30 connects the touch pen 1 and the wire 20.

The body 30 is made of a cylinder structure in general, and is formed of a first partial body portion 30A and a second partial body portion 30B, wherein the first and second partial body portions 30A and 30B have respective sub-cylindrical shapes and are assembled with each other. An assembly protrusion 31 and an assembly groove 32 are provided on contact surfaces between the first partial body portion 30A and the second partial body portion 30B, and are assembled by a male and female coupling.

In opposite sides in the body 30, a first through groove 33 and a second through groove 34 are provided and the wire 20 and the touch pen 1 penetrate therethrough respectively. In addition, a first locking groove 35 and a second locking groove 36 are provided therein and are respectively connected to the first through groove 33 and the second through groove 34 so that the locking part 23 of the wire 20 and a head of the touch pen 1 are seated thereon.

The first partial body portion 30A is provided with a coupling hole 37 in which the locking clip 50 is inserted and coupled. In addition, at the position corresponding to the coupling hole 37 in the inside of the second partial body portion 30B, a coupling groove 38 is provided and the locking clip 50 is seated thereon.

The housing 40 is made of a cylindrical structure having an inner hole 41 therein, and is fitted over an outer circumferential surface of the body 30. That is, the body 30 is inserted into the inner hole 41 so that the first partial body portion 30A and the second partial body portion 30B of the body 30 are not separated from each other.

The housing 40 is provided with a coupling hole 47 at a position corresponding to the coupling hole 37 of the first partial body portion 30A. The coupling hole 47 has a guide groove 45 at an inner wall thereof so that a user can remove the locking clip 50 from the housing 40 by putting a driver or a user's nail into the guide groove 45.

The locking clip 50 is inserted into and coupled to the coupling hole 47 of the housing 40 and inserted into and coupled to the coupling hole 37 of the first partial body portion 30A, thereby preventing the body 30 and the housing 40 from being separated from each other.

The locking clip 50 is made of a clip body 51 having two leg portions defining a space therebetween, wherein the locking part 23 of the wire 20 is received in the space. In addition, a locking step 53 is formed on each of opposite outer surfaces of the two leg portions of the clip body 51 and locked to a corresponding inner wall of the coupling hole 37 of the first partial body portion 30A, and an eject groove 55 is formed on an upper part of a side surface of the clip body 51.

The clip body 51 is provided with a slope 52 at an outer lower end so that the clip body 51 is easily inserted into the coupling hole 47. The locking step 53 has a protrusion length for preventing the locking clip 50 from being unlocked by an unintended impact and for releasing lock of the locking clip 50 by a force intentionally applied by the user for separation.

The locking clip 50 may be separated from the coupling hole 47 of the housing 40 by a user's nail or an end of the driver being inserted into the eject groove 55 and raising the eject groove 55.

Referring to FIGS. 4A to 4D, a process for connecting the locking part 23 of the wire 20 and the head 3 of the touch pen 1 will be described.

Figure 4A:
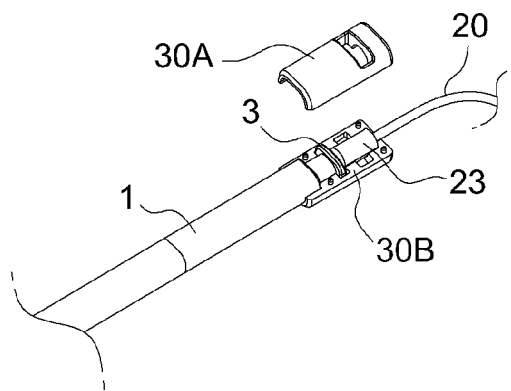
FIGS. 4A to 4D are views showing a process in which a locking part of a wire and a head of the touch pen are connected together by using a body and a housing.

The locking part 23 of the wire 20 and the head 3 of the touch pen 1 are respectively seated on the first locking groove 35 and the second locking groove 36 of the first partial body portion 30A (or the second partial body portion 30B) of the body 30 (referring to FIG. 4A).

Figure 4B:
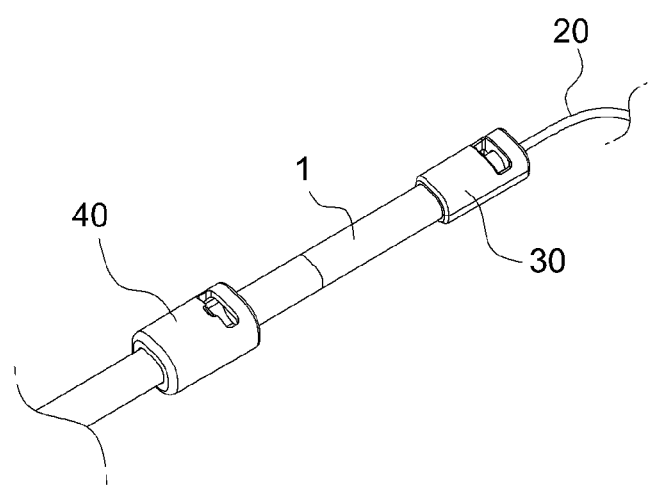

The first partial body portion 30A and the second partial body portion 30B are assembled by the male and female coupling between the assembly protrusion 31 and the assembly groove 32 (referring to FIG. 4B).

Figure 4C:
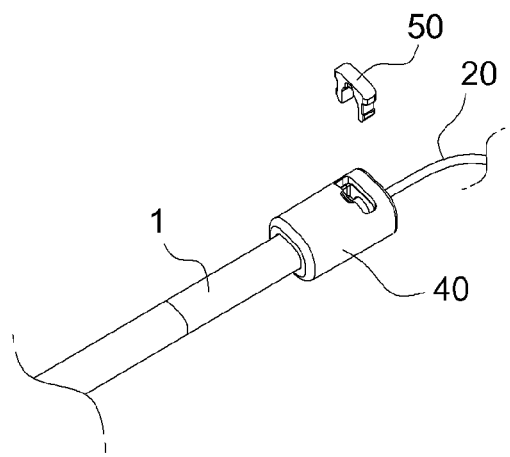

The touch pen 1 is inserted to penetrate into the inner hole 41 of the housing 40, and the housing 40 is moved along the touch pen 1 to cover the body 30 (referring to FIG. 4C).

Figure 4D:
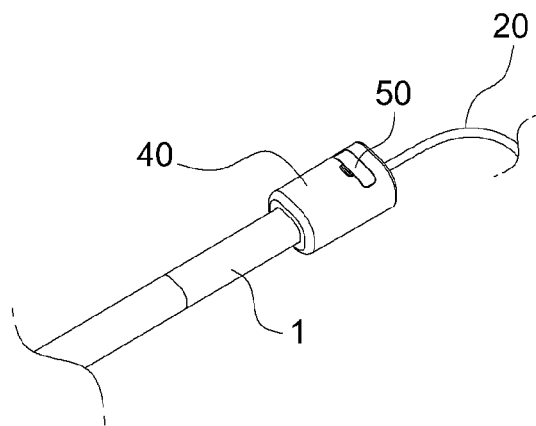

The coupling hole 37 of the first partial body portion 30A and the coupling hole 47 of the housing 40 are aligned with each other, and then the locking clip 50 is inserted into the aligned coupling holes so that the housing 40 and the body 30 are coupled to each other (referring to FIG. 4D).

Although the touch pen holder unit having specific shapes and configurations for the touch pen of the present invention has been described for illustrative purposes, those skilled in the art will appreciate that various modifications, additions, and substitutions are possible, and such modifications, additions, and substitutions are to be interpreted as belonging to the scope of the present invention.

What is claimed is:

1. A touch pen holder unit, comprising:
   a touch pen having a head;
   a wire having a locking part at an end thereof;
   a body formed of a first partial body portion and a second partial body portion, wherein a first portion of the locking part of the wire and a first portion of the head of the touch pen are seated on the first partial body portion, wherein a second portion of the locking part of the wire and a second portion of the head of the touch pen are seated on the second partial body portion, wherein each of the first partial body portion and the second partial body portion has a first locking groove at an upper portion thereof so as to seat the locking part of the wire thereon, and wherein each of the first partial body portion and the second partial body portion has a second locking groove below the first locking groove so as to seat the head of the touch pen thereon;
   a housing fitted over an outer circumferential surface of the first partial body portion and over an outer circumferential surface of the second partial body portion, and preventing the first partial body portion and the second partial body portion from being separated from each other, wherein the first partial body portion has a coupling hole and the housing has a coupling hole; and
   a locking clip inserted into the coupling hole of the housing and into the coupling hole of the first partial body portion, and preventing the body and the housing from being separated from each other, wherein the locking clip includes: a clip body having two leg portions defining a space therebetween, wherein the locking part of the wire is received in the space defined between the two leg portions; a locking step formed on each of opposite outer surfaces of the two leg portions of the clip body and locked to a corresponding inner wall of the first partial body portion; and an eject groove formed on an upper part of a side surface of the clip body.

\* \* \* \* \*